(12) United States Patent
Guo et al.

(10) Patent No.: US 11,746,266 B2
(45) Date of Patent: Sep. 5, 2023

(54) ADHESIVE COMPOSITION

(71) Applicants: Dow Global Technologies LLC, Midland, MI (US); Rohm and Haas Company, Collegeville, PA (US); Dow Quimica De Colombia S.A., Bogota (CO)

(72) Inventors: Yinzhong Guo, Pearland, TX (US); Juan Carlos Casarrubias, Mexico City (MX); Kevin K. Miyake, Tower Lakes, IL (US); Mateus Batista Torres Cipro, Sao Paulo (BR); Elkin David Cardona Jimenez, Medellin (CO)

(73) Assignee: The Dow Chemical Company, Midland, MI (US)

( * ) Notice: Subject to any disclaimer, the term of this patent is extended or adjusted under 35 U.S.C. 154(b) by 242 days.

(21) Appl. No.: 17/068,348

(22) Filed: Oct. 12, 2020

(65) Prior Publication Data

US 2022/0106505 A1    Apr. 7, 2022

Related U.S. Application Data

(60) Provisional application No. 63/086,295, filed on Oct. 1, 2020.

(51) Int. Cl.

| | | |
|---|---|---|
| *C09J 175/08* | (2006.01) | |
| *B32B 7/12* | (2006.01) | |
| *B32B 15/085* | (2006.01) | |
| *B32B 15/20* | (2006.01) | |
| *B32B 37/12* | (2006.01) | |
| *C09J 175/06* | (2006.01) | |
| *C08G 18/38* | (2006.01) | |
| *C08G 18/42* | (2006.01) | |
| *C08G 18/36* | (2006.01) | |

(Continued)

(52) U.S. Cl.
CPC ............... *C09J 175/08* (2013.01); *B32B 7/12* (2013.01); *B32B 15/085* (2013.01); *B32B 15/20* (2013.01); *B32B 37/12* (2013.01); *B65D 81/34* (2013.01); *C08G 18/36* (2013.01); *C08G 18/3885* (2013.01); *C08G 18/4018* (2013.01); *C08G 18/4202* (2013.01); *C08G 18/4211* (2013.01); *C08G 18/4216* (2013.01); *C08G 18/4219* (2013.01); *C08G 18/4238* (2013.01); *C08G 18/4829* (2013.01); *C08G 18/5045* (2013.01); *C08G 18/5075* (2013.01); *C08G 18/7671* (2013.01); *C08G 18/797* (2013.01); *C08G 18/8025* (2013.01); *C08L 75/04* (2013.01); *C09J 175/04* (2013.01); *C09J 175/06* (2013.01); *B32B 2037/1269* (2013.01); *C08G 18/4208* (2013.01); *C08G 2170/00* (2013.01); *C08G 2190/00* (2013.01)

(58) Field of Classification Search
CPC ...... C09J 175/08; C09J 175/06; C09J 175/04; B32B 7/12; B32B 15/085; B32B 15/20; B32B 37/12; B32B 2037/1269; C08G 18/3885; C08G 18/4202; C08G 18/4208; C08G 2170/00; C08G 2190/00; C08G 18/36; C08G 18/4018; C08G 18/3211; C08G 18/3216; C08G 18/4219; C08G 18/4238; C08G 18/4829; C08G 18/5045; C08G 18/5075; C08G 18/7671; C08G 18/797; C08G 18/8025; C08G 18/4211; C08G 18/4216; B65D 81/34; C08L 75/04
See application file for complete search history.

(56) References Cited

U.S. PATENT DOCUMENTS

| | | |
|---|---|---|
| 8,835,009 B2 | 9/2014 | Shah et al. |
| 9,550,930 B2 | 1/2017 | Breese et al. |

(Continued)

FOREIGN PATENT DOCUMENTS

| | | |
|---|---|---|
| CN | 102604583 B | 12/2013 |
| DE | 102009043042 B4 | 10/2013 |

(Continued)

OTHER PUBLICATIONS

PCT/US2021/047915 Search Report and Written Opinion dated Dec. 23, 2021.

*Primary Examiner* — Rabon A Sergent
(74) *Attorney, Agent, or Firm* — Boyle Fredrickson, S.C.

(57) ABSTRACT

A two-component solventless polyurethane adhesive composition including (A) at least one isocyanate component and (B) at least one polyol component. The isocyanate component (A) comprises an isocyanate prepolymer that is the reaction product of (Ai) a polyisocyanate and (Aii) an isocyanate-reactive component; wherein the isocyanate-reactive component comprises (Aiia) at least one polyol having a functionality greater than two, (Aiib) at least one aromatic polyester polyol having a functionality of greater than two, and (Aiic) at least one hydrophobic polyol. The polyol component (B) comprises (Bi) at least one polyether polyol having a functionality greater than two, (Bii) at least one aromatic polyester polyol transesterified with a natural oil, and (Biii) at least one phosphate ester polyol. A method for forming a laminate is also disclosed, the method comprising the steps of: (I) mixing the above reactants (components (A) and (B)) to form a solventless adhesive composition, (II) applying a layer of the solventless adhesive composition to a surface of a first substrate, (III) bringing the layer of the solventless adhesive composition on the first substrate into contact with a surface of a second substrate to form a laminate, and (IV) curing the solventless adhesive composition. A laminate comprising the above solventless adhesive composition is also disclosed.

14 Claims, No Drawings

(51) Int. Cl.
*C09J 175/04* (2006.01)
*C08G 18/48* (2006.01)
*C08G 18/76* (2006.01)
*C08G 18/50* (2006.01)
*C08G 18/79* (2006.01)
*C08G 18/80* (2006.01)
*C08L 75/04* (2006.01)
*C08G 18/40* (2006.01)
*B65D 81/34* (2006.01)

(56) References Cited

U.S. PATENT DOCUMENTS

2015/0353771 A1 12/2015 Kendi
2020/0157393 A1 5/2020 Li et al.

FOREIGN PATENT DOCUMENTS

| FR | 2997957 A1 | 5/2014 |
| JP | 2004035596 A | 2/2004 |
| WO | 1999060068 A1 | 11/1999 |
| WO | 2011109720 A1 | 9/2011 |
| WO | 2015178360 A1 | 11/2015 |

ADHESIVE COMPOSITION

FIELD

The present invention relates to adhesive compositions; and more specifically, the present invention relates to a two-component, solventless polyurethane-based laminating adhesive composition for use with laminate films which are used, for example, in packaging applications. The present invention further relates to a process of forming laminate structures comprising the disclosed two-component, solventless polyurethane-based laminating adhesive composition; the laminates themselves produced using such process; and articles made from such laminates.

BACKGROUND

As known in the art, two-component (2K) type polyurethane adhesive compositions are based on the reaction mixture of a polyol component and a polyisocyanate component. The two components can be mixed together and reacted to form a cured polyurethane adhesive; and the reaction can form a strong adhesive bond between two or more types of substrates. Heretofore, various 2K type polyurethane adhesive compositions have been produced for a wide variety of purposes. For instance, adhesive compositions are used to bond together substrates such as polyethylene, polypropylene, polyester, polyamide, metal, metallized, paper, or cellophane to form composite films, i.e., laminates. The use of adhesives in different end-use applications is generally known. For example, adhesives can be used in the manufacture of film/film and film/foil laminates used in the packaging industry, especially for food packaging. Adhesives used in laminating applications, or "laminating adhesives," can be generally placed into three categories: solvent-based, water-based, and solventless (or solvent free). The performance of an adhesive varies by category and by the application in which the adhesive is applied.

Solventless laminating adhesives can be applied up to 100 percent (%) solids without either organic solvents or an aqueous carrier. Because no organic solvent or water has to be dried from the adhesive upon application, these adhesives can be run at high line speeds of laminating equipment, and therefore, provide a high productivity rate for manufacturing laminates. Solvent and water-based laminating adhesives are limited by the running rate at which the solvent or water can be effectively dried and removed from the adhesive-coated substrates after application of the adhesive before laminating onto another substrate to form a laminate structure. In addition, solventless laminating adhesives provide environmental, health, and safety benefits.

Within the category of solventless laminating adhesives, there are many varieties. One particular variety includes a 2K polyurethane-based laminating adhesive premixed prior to application. Typically, a 2K polyurethane-based laminating adhesive includes a first component comprising an isocyanate-containing prepolymer and/or a polyisocyanate and a second component comprising a polyol or a combination of two or more polyols. In particular, the second component comprises a polyether and/or polyester functionalized with two or more hydroxyl groups per molecule. The isocyanate first component and the polyol second component are combined in a predetermined ratio, or "premixed," to form a laminating adhesive composition. The adhesive composition can then be applied on a substrate which can be laminated to another substrate to form a laminate structure. The laminate structure can comprise a number of laminated films suitable for use in food packaging applications.

Bond strength, processability, and chemical resistance are important properties for solventless adhesives used in demanding food packaging applications, e.g., hot fill, boil-in-bag, and retort applications. A freshly laminated structure comprising an existing 2K solventless adhesive typically does not exhibit any immediate bond, or "green strength," for a number of hours as the two components gradually build molecular weight and bond strength in-situ. Waiting for the molecular weight build up before further processing is a constraint for film converters, who often must wait until at least 3 days or beyond for additional processing, e.g., slitting the final laminated film. In addition, existing solventless adhesives typically demonstrate poor product resistance, compared to solvent-based adhesives, even though cross-linking builds up molecular weight and dry bonding after curing.

Resistance to ink smearing and thermal resistance are additional important properties for solventless adhesives used in packaging applications. Additionally, global food safety regulation is becoming more powerful in driving the packaging industry. Thus, fast curing, fast primary aromatic amine ("PAA") decay, and the ability to meet global regulations are further considerations for film converters.

Accordingly, 2K solventless laminating adhesive compositions exhibiting improved bond strength, chemical and thermal resistance, resistance to ink smearing, and processability; and methods of making laminates comprising same, are desirable.

SUMMARY

The present invention is directed to a novel 2K (i.e., a two-part system) solventless laminating adhesive composition including (A) at least one isocyanate component and (B) at least one polyol component. In some embodiments, the isocyanate component (A) comprises at least one isocyanate prepolymer that is the reaction product of (Ai) at least one polyisocyanate and (Aii) at least one isocyanate-reactive component. In some embodiments, the isocyanate-reactive component (Aii) comprises the following components: (Aiia) at least one polyether polyol having a functionality greater than two, (Aiib) at least one aromatic polyester polyol having a functionality of greater than two, and (Aiic) at least one hydrophobic polyol. In some embodiments, the polyol component (B) comprises (Bi) at least one polyether polyol having a functionality greater than two, (Bii) at least one aromatic polyester polyol transesterified with a natural oil, and (Biii) at least one phosphate ester polyol. In some embodiments, the aromatic polyester polyol component (Bii) comprises a hydrophobic polyester polyol.

In some embodiments, the polyisocyanate, component (Ai), useful for producing the isocyanate prepolymer, component (A), is at least one aromatic polyisocyanate, such as 4,4'-methylene diphenyl diisocyanate or modified 4,4'-methylene diphenyl diisocyanate or mixtures thereof.

In some embodiments, the polyol having a functionality greater than two, component (Aiia), useful for producing the isocyanate-reactive component, component (Aii), comprises at least one polyether polyol.

In some embodiments, the aromatic polyester polyol having a functionality of greater than two, component (Aiib), useful for producing the isocyanate-reactive component, component (Aii), is at least one phthalate based polyester polyol, such as isophthalate, phthalic anhydride, terephthalate, or their two or three mixture reacted with trimethylolpropane and diols such as, ethylene glycol, diethylene glycol, propylene glycol, butane diol, 2-methyl propane diol, or their two or more mixtures.

In some embodiments, the hydrophobic polyol, component (Aiic), useful for producing the isocyanate-reactive component, component (Aii), is at least one polyester polyol which is made from hexane diol, neopentyl glycol, octane diol, or the diols with a number of carbon atoms of less than 18 carbons or their two or more mixtures, reacted with dicarboxylic acids such as adipic acid, phthalic acid, azelaic acid, sebacic acid, dicarboxylic acid with carbon atoms of less than 18 carbons, or mixtures thereof. In some embodiments, the hydrophobic polyol is polybutylene oxide.

In some embodiments, the components which are useful for producing the isocyanate-reactive component (Aii), namely the polyol having a functionality greater than two, component (Aiia); the aromatic polyester polyol having a functionality of greater than two, component (Aiib); and the hydrophobic polyol, component (Aiic); can be combined together forming component (Aii) before adding the mixture to component (Ai); and then, the mixture forming component (Aii), can be subsequently mixed with component (Ai). In other embodiments, the components (Aiia), Aiib) and (Aiic) can each individually be added separately to component (Ai) and substantially simultaneously be mixed with component (Ai) to react with each other to form isocyanate component (A).

In some embodiment, the polyether polyol having a functionality greater than two, component (Bi), is for example a glycerin initiated polypropylene oxide, polyethylene oxide, polybutylene oxide or their mixed copolymers.

In some embodiments, the natural oil used for making the transesterified polyols, component (Bii), is castor oil, and in some embodiments, component (Bii) is modified natural oil, such as a dimer diol.

In some embodiments, the phosphate ester polyol, component (Biii), is made from a tri-functional propylene glycol, a polyphosphoric acid, and a polyisocyanate, the phosphate ester polyol having a phosphoric acid content of less than 3 weight percent (wt %) based on the weight of the phosphate ester polyol, and a viscosity of less than 40,000 milliPascals-seconds (mPa·s) at 25 degrees Celsius (° C.).

A method for forming the above laminate is also disclosed herein.

DETAILED DESCRIPTION

In one general embodiment, the present invention comprises a two-component (2K) polyurethane (PU) laminating adhesive composition; and more specifically, the present invention comprises a 2K PU laminating adhesive which includes: (A) at least one isocyanate component (or an isocyanate group-containing component); and (B) at least one polyol component (or a hydroxyl group-containing component). In some embodiments, the components are mixed to form a curable adhesive composition usable in, for instance, a laminate structure adapted for food packaging applications.

In general, the isocyanate group-containing component, component (A), can be a single compound or a mixture (or blend) of one or more compounds. For example, in some embodiments, the isocyanate component comprises an isocyanate prepolymer, component (A). In a preferred embodiment, the isocyanate prepolymer, component (A), is the reaction product of (Ai) a polyisocyanate and (Aii) an isocyanate-reactive component.

As used herein, a "polyisocyanate" is any compound that contains two or more isocyanate groups. For example, polyisocyanates may include dimers, trimers, and the like. Further, suitable polyisocyanates for use according to this disclosure can be selected from the group consisting of aromatic polyisocyanates, aliphatic polyisocyanates, cycloaliphatic polyisocyanates, and combinations of two or more thereof. An "aromatic polyisocyanate" is a polyisocyanate that contains one or more aromatic rings. An "aliphatic polyisocyanate" contains no aromatic rings. A "cycloaliphatic polyisocyanate" is a subset of aliphatic polyisocyanates, wherein the chemical chain is ring-structured.

Suitable aromatic polyisocyanates include, but are not limited to, 1,3- and 1,4-phenylene diisocyanate, 1,5-naphthylene diisocyanate, 2,6-tolulene diisocyanate, 2,4-tolulene diisocyanate ("2,4-TDI"), 2,4'-diphenylmethane diisocyanate ("2,4'-MDI"), 4,4'-diphenylmethane diisocyanate ("4,4'-MDI"), 3,3'-dimethyl-4,4'-biphenyldiisocyanate ("TODI"), polycarbodiimide-modified 4,4'-diphenylmethane diisocyanate, and mixtures of two or more thereof.

Suitable aliphatic polyisocyanates have 3 to 16 carbon atoms, or 4 to 12 carbon atoms, in the linear or branched alkylene residue, such as hexamethylene diisocyanate ("HDI") and 1,4-diisocyanatobutane. Suitable cycloaliphatic polyisocyanates have 4 to 18 carbon atoms, or 6 to 15 carbon atoms, in the cycloalkylene residue. Cycloaliphatic diisocyanates refer to both cyclically and aliphatically bound NCO groups, such as isophorone diisocyanate ("IPDI"), 1,3/1,4-diisocyanatocyclohexane 1,3-/1,4-bis(isocyanatomethyl)cyclohexane, and diisocyanatodicyclohexylmethane ("H$_{12}$MDI").

Suitable aliphatic and cycloaliphatic polyisocyantes include, but are not limited to, cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate ("TIN"), decane di- and triisocyanate, undecane di- and triisocyanate and dodecane di- and triisocyanate, isophorone diisocyanate ("IPDI"), hexamethylene diisocyanate ("HDI"), diisocyanatodicyclohexylmethane ("H$_{12}$MDI"), 2-methylpentane diisocyanate ("MPDI"), 2,2,4-trimethylhexamethylene diisocyanate/2,4,4-trimethylhexamethylene diisocyanate ("TMDI"), norbornane diisocyanate ("NBDI"), xylylene diisocyanate ("XDI"), tetramethylxylylene diisocyanate, and dimers, trimers, and mixtures of the of two or more thereof.

Additional polyisocyanates suitable for use according to this disclosure include, but are not limited to, 4-methylcyclohexane 1,3-diisocyanate, 2-butyl-2-ethylpentamethylene diisocyanate, 3(4)-isocyanatomethyl-1-methylcyclohexyl isocyanate, 2-isocyanatopropylcyclohexyl isocyanate, 2,4'-methylenebis(cyclohexyl) diisocyanate, 1,4-diisocyanato-4-methyl-pentane, and mixtures of two or more thereof.

In some embodiments, the polyisocyanate described above can be mixed together with a mono-functional isocyanate.

Commercially available examples of polyisocyanates suitable for use according to this disclosure include products sold under the trade name ISONATE™ 125M, ISONATE™ 143L, and ISONATE™ 50OP, all which are available from The Dow Chemical Company.

In some embodiments, the isocyanate-reactive component (Aii) to be reacted with the polyisocyanate to form the isocyanate prepolymer, comprises (Aiia) a first polyether polyol having a functionality greater than two. In some embodiments, the polyol having a functionality greater than two can have, for instance, a hydroxyl functionality greater than two. As used herein, the term "hydroxyl functionality" refers to the number of isocyanate-reactive sites on a molecule. For polyols, an average hydroxyl functionality is generally the total moles of OH divided by the total moles of polyol. In some embodiments, the polyol having a functionality greater than two is at least one polyether polyol. Commercially available examples of the polyol having a functionality greater than two suitable for use according to this disclosure include products sold under the trade names VORANOL™ CP-1055 and VORANOL™ 232-034N, each available from The Dow Chemical Company.

In some embodiments, the isocyanate-reactive component (Aii) to be reacted with the polyisocyanate to form the isocyanate prepolymer, comprises (Aiib) a second aromatic polyester polyol having a functionality of greater than two. In some embodiments, the aromatic polyester polyol having a functionality of greater than two can have, for instance, a hydroxyl functionality of greater than two. In some embodiments, the aromatic polyester polyol having a functionality of greater than two is derived from isophthalate and has an equivalent weight from 300 grams per mole (g/mol) to 600 g/mol. As used herein, "equivalent weight" of a compound refers to the molecular weight of the compound per reactive site (i.e., the molecular weight divided by hydroxyl functionality for a polyol). In some embodiments, the aromatic polyester polyol having a functionality of greater than two is a diethylene glycol ("DEG"), trimethylolpmpane, phthalate adipate-based material.

In some embodiments, the isocyanate-reactive component (Aii) to be reacted with the polyisocyanate to form the isocyanate prepolymer, comprises (Aiic) a third hydrophobic polyol. In some embodiments, the hydrophobic polyol is selected from the group consisting of a polyester polyol, a polyether polyol, and mixtures thereof. In some embodiments, the hydrophobic polyol of the isocyanate-reactive component is a polyester polyol made from a diol and a dicarboxilic acid. Examples of diols suitable for use according to this disclosure include neopentylglycol, 2-methylpropylene diol, hexane diol, and other alkylene diols having from 6 carbon atoms to 16 carbon atoms in the main chain. In some embodiments, the hydrophobic polyol of the isocyanate-reactive component has an equivalent weight from 300 g/mol to 600 g/mol. In some embodiments, the hydrophobic polyol has a functionality of 3. In some embodiments, the hydrophobic polyol is a hexanediol adipate-based material. In some embodiments, exemplary of dicarboxylic acids suitable for use in the present invention, include adpic acid, azelaic acid, sebacic acid, dicarboxylic acid with carbon atoms of less than 18, or mixtures thereof. In some embodiments, the hydrophobic polyol is, for example, polybutylene oxide.

In some embodiments, (Aiia) the polyether polyol having a functionality greater than two, (Aiib) the aromatic polyester polyol having a functionality of greater than two, and (Aiic) the hydrophobic polyol, each in the isocyanate-reactive component (Aii), are the same polyester polyol. That is, in some embodiments, a single species of polyester polyol is aromatic, has a functionality of greater than two, and is hydrophobic. The aromatic polyester polyol can be derived from isophthalate anhydride, orthophthalate anhydride, tetraphthalate anhydride, and mixtures of two or more thereof.

In some embodiments, the average hydroxyl number for the isocyanate-reactive component (Aii) of the isocyanate prepolymer can be, for example, from 50 milligrams of potassium hydroxide per gram of prepolymer (mg KOH/g) to 150 mg KOH/g in one embodiment; or from 85 mg KOH/g to 140 mg KOH/g in another embodiment; or from 90 mg KOH/g to 120 mg KOH/g in still another embodiment. In some embodiments, the average molar mass of each hydroxyl functionality of the isocyanate-reactive component is, for example, from 510 g/mol to 700 g/mol in one embodiment; or from 560 g/mol to 660 g/mol in another embodiment; or from 590 g/mol to 620 g/mol in still another embodiment. In some embodiments, the average functionality of the isocyanate-reactive component can be, for example, from 2 to 3 in one embodiment; or from 2.1 to 2.9 in another embodiment; or from 2.2 to 2.8 in still another embodiment.

Compounds having polyisocyanate groups, such as the isocyanate prepolymer of the isocyanate component, may be characterized by the parameter "% NCO," which is the amount of polyisocyanate groups by weight based on the weight of the compound. The parameter % NCO is measured by the method of ASTM D2572-97. In some embodiments, the isocyanate prepolymer has a % NCO content of at least 10%. In some embodiments, the isocyanate prepolymer has a % NCO content not to exceed 18%. In some embodiments, the isocyanate prepolymer has a % NCO content from 10% to 18%. In some embodiments, the isocyanate prepolymer has a % NCO content from 11% to 16%.

In some embodiments, the isocyanate prepolymer has a viscosity of less than 8,000 mPa·s at 25° C. and in some embodiments, the isocyanate prepolymer has a viscosity of less than 5,000 mPa·s at 25° C., as measured by the method of ASTM D2196.

In some embodiments, the polyester polyols present in the isocyanate prepolymer (i.e., any of the polyol having a functionality greater than two, the aromatic polyester polyol having a functionality of two, and/or the hydrophobic polyol) comprise at least 10 wt % of the isocyanate prepolymer, based on the weight of the isocyanate prepolymer.

The solventless adhesive composition further comprises a polyol component (B) comprising (Bi) a polyether polyol having a functionality greater than two, (Bii) an aromatic hydrophobic polyester polyol from transesterification, and (Biii) a phosphate ester polyol. In some embodiments, the polyol component has an average functionality of, for example, from 2 to 8 in one embodiment, or from 2.1 to 7 in another embodiment.

In some embodiments, the polyol component (B) to be reacted with the isocyanate component (A) to form the curable adhesive composition, comprises (Bi) a polyether polyol having an average functionality greater than two. In some embodiments, the polyether polyol having a functionality greater than two can have, for instance, a hydroxyl functionality greater than two. In some embodiments, the polyether polyol having a functionality greater than two has an equivalent weight from 100 g/mol to 1,600 g/mol. In some embodiments, the polyether polyol having a functionality greater than two has an equivalent weight from 200 g/mol to 400 g/mol. Commercially available examples of the polyether polyol having a functionality greater than two suitable for use according to this disclosure include products sold under the trade name VORANOL™ CP-450, VORANOL™ CP-775, VORANOL™ CP-1055 available from The Dow Chemical Company. In some embodiments, the polyether polyol having an average functionality greater than two is a mixture of a tri-functional and a difunctional polypropylene oxide, such as VORANOL™ 220-110 blended with VORANOL™ CP-1055, VORANOL™ CP-450, VORANOL™ CP-775 or mixtures thereof.

In some embodiments, the polyol component to be reacted with the isocyanate component to form the curable adhesive composition, comprises (Bii) an aromatic polyester polyol transesterified with a natural oil. In some embodiments, the natural oil is castor oil. In some embodiments, the transesterified aromatic polyester polyol has an equivalent weight from 100 to 600 g/mol. In some embodiments, the transesterified aromatic polyester polyol of the polyol component is hydrophobic and exhibits a viscosity of less than 3,000 mPa·s at 25° C., as measured by the method of ASTM D2196. Commercially available examples of the transesterified aromatic polyester polyol suitable for use according to this disclosure include products sold under the trade name MOR-FREE™ C-156 available from The Dow Chemical Company and STEPANOL™ BC-180 available from Stepan Company.

In some embodiments, the polyol component to be reacted with the isocyanate component to form the curable adhesive composition, comprises (Biii) a phosphate ester polyol is made from a tri-functional propylene glycol, a polyphosphoric acid, and a polyisocyanate. Commercially available examples of the tri-functional propylene glycol suitable for use according to this disclosure include products sold under the trade names VORANOL™ CP-450, VORANOL™ CP-260, VORANOL™ CP-755, and VORANOL™ CP-1055 each available from The Dow Chemical Company. In some embodiments, the phosphate ester polyol has a phosphoric acid content of less than 4 wt % based on the weight of the phosphate ester polyol, or a phosphoric acid content of from 0 wt % to 3 wt % based on the weight of the phosphate ester polyol, or a phosphoric acid content of from 1.5 wt % to 2.5 wt % based on the weight of the phosphate ester polyol. In some embodiments, the phosphate ester polyol has a viscosity less than 40,000 mPa·s at 25° C., or less than 35,000 mPa·s at 25° C., as measured by the method of ASTM D2196. In some embodiments, the phosphate ester polyol has a hydroxyl equivalent weight less than 330 g/mol. In some embodiments, the phosphate ester polyol has from 0 wt % to 10 wt %, based on the weight of the phosphate ester, of a tri-functional polyether polyol having an equivalent weight less than 2,000 g/mol.

In some embodiments, the polyester polyols present in the polyol component (i.e., the aromatic polyester polyol transesterified with a natural oil and/or the hydrophobic polyester polyol) comprise at least 15 wt % of the polyol component, based on the weight of the polyol component.

Although the present invention is directed to a two-component system, the solventless laminating adhesive composition of the present invention may be formulated with a wide variety of optional additives, component (C), to enable performance of specific functions while maintaining the excellent benefits/properties of the present solventless laminating adhesive composition. The optional components of the adhesive may be added to the isocyanate component (A); or the optional components of the adhesive may be added to the polyol component (B); or the optional components of the adhesive may be added to both the isocyanate component (A) and the polyol component (B). For example, in some embodiments, one or more optional additives may be included in the isocyanate component and/or polyol component. Examples of such optional additives include, but are not limited to, catalysts, tackifiers, plasticizers, rheology modifiers, adhesion promoters, antioxidants, fillers, colorants, surfactants, wetting agents, defoamers, and combinations of two or more thereof.

In one broad embodiment, the process for making the two-component system, solventless laminating adhesive composition of the present invention includes mixing, admixing or blending: (A) at least one isocyanate component; and (B) at least one polyol component.

In a preferred embodiment, the component (A) includes (Ai) at least one polyisocyanate; and (Aii) at least one isocyanate-reactive component, wherein the isocyanate-reactive component (Aii) comprises (Aiia) at least one polyether polyol having a functionality greater than two; (Aiib) at least one aromatic polyester polyol having a functionality of greater than two; and (Aiic) at least one hydrophobic polyester polyol; and the polyol component (B) includes (Bi) at least one polyether polyol having a functionality greater than two; (Bii) at least one hydrophobic polyester polyol from an aromatic polyester polyol transesterified with a natural oil; and (Biii) at least one phosphate ester polyol.

In one general embodiment, the method for forming a two-component solventless adhesive composition comprises mixing a reaction mixture of the isocyanate component (A) and the polyol component (B). The isocyanate component (A) comprises an isocyanate prepolymer, that is, a prepolymer reaction product prepared by reacting a polyisocyanate and an isocyanate-reactive component. In some embodiments, the isocyanate-reactive component comprises a polyol having a functionality greater than two, an aromatic polyester polyol having a functionality of greater than two, and a hydrophobic polyol. The adhesive composition includes a polyol component (B) comprising a polyether polyol having a functionality greater than two, an aromatic polyester polyol transesterified with a natural oil, and a phosphate ester polyol.

One or more additional optional components may be added to the adhesive formulation as desired. For example, the components (A) and (B) can be mixed together in the desired concentrations discussed above and at a temperature of from 5° C. to 50° C. in one embodiment; and from 20° C. to 45° C. in another embodiment. The order of mixing of the components is not critical and two or more components can be mixed together followed by addition of the remaining components. The adhesive formulation components may be mixed together by any known mixing process and equipment. In general, the two components (A) and (B) are prepared separately from one another; and the components are each stored in separate suitable storage containers known in the art. The other components and optional additives of the adhesive may be present as part of the first component (A) or the second component (B). Prior to the application of the adhesive composition, the two components are stored separately and mixed with one another only during or immediately prior to the application.

In another general embodiment, the method for forming a laminate using the two-component solventless adhesive composition of the present invention comprises the steps of: (1) applying a layer of the adhesive composition to a surface of a first substrate, (2) bringing the layer of the adhesive into contact with a surface of a second substrate to form a composite laminate, and (3) curing the adhesive composition to bond the two substrates together.

The 2K solventless laminating adhesive composition of the present invention advantageously provides an increase in the properties of a laminate produced using the solventless laminating adhesive composition or maintains the properties of the laminate, such as PAA decay, bond strength, heat resistance, product resistance for foil-based or metalized film-based lamination structures (e.g., foil/nylon) useful for various articles. For example, while the 2K adhesive composition of the present invention can be used in a variety of applications; the present invention adhesive can be particularly useful in packaging applications.

In one preferred embodiment, the method for forming a laminate structure of the present invention, comprises the steps of:

(I) mixing reactants to form a solventless adhesive composition, the reactants comprising: (A) at least one isocyanate component comprising an isocyanate prepolymer that is the reaction product of: (Ai) at least one polyisocyanate; and (Aii) at least one isocyanate-reactive component comprising: wherein component (Aii) includes: (Aiia) at least one polyether polyol having a functionality greater than two; (Aiib) at least one aromatic polyester polyol having a functionality of greater than two; and (Aiic) at least one hydrophobic polyol a functionality of two; and (B) at least one polyol component comprising: (Bi) at least one polyether polyol having a functionality greater than two; (Bii) at least one aromatic polyester polyol transesterified with a natural oil; and (Biii) at least one phosphate ester polyol;

(II) applying a layer of the solventless adhesive composition from step (I) to a surface of a first substrate;

(III) bringing the layer of the solventless adhesive composition on the surface of the first substrate from step (II) into contact with a surface of a second substrate to form a laminate; and (IV) curing the adhesive composition.

The two-component solventless laminating adhesive composition of the present invention produced by the process of the present invention has several advantageous properties and benefits compared to conventional adhesive formulations. For example, some of the properties exhibited by the solventless laminating adhesive can include good adhesion (bond strength) between a metalized layer and a foil layer structure, good product resistant such as chemical resistance, good ink smearing resistance, good adhesion for a digital ink printing structure, faster PAA decay (e.g., after 2 days of curing the adhesive of the present invention meets current regulatory requirements), and good heat resistance; properties that are beneficial in a process for manufacturing a laminated film for use in forming a package article for food packaging.

For example, the bond strength exhibited by the solventless laminating adhesive can be generally greater than or equal to (≥) 1,000 grams per 25.4 millimeters (g/25.4 mm) in one embodiment; ≥1,100 g/25.4 mm in another embodiment; and ≥1,200 g/25.4 mm above in still another embodiment for foil lamination structure after fully curing. In some embodiments, the bond strength exhibited by the solventless laminating adhesive can be from 1,000 g/25.4 mm to 10,000 g/25.4 mm.

The product resistance, for example chemical resistance, exhibited by the solventless laminating adhesive, in terms of bond strength after exposed to such product or chemical, can be generally a bond strength of ≥100 g/25.4 mm in one embodiment, ≥120 g/25.4 mm in another embodiment, and ≥150 g/25.4 mm in still another embodiment, for example, after 100 hours of Morton sauce aging at 60° C. In some embodiments, the bond strength establishing product resistance exhibited by the solventless laminating adhesive can be from 100 g/25.4 mm to 10,000 g/25.4 mm. In a preferred embodiment, the solventless laminating adhesive has sufficient product resistance to be useful, for example, for foil-based or metalized film-based lamination structures (e.g., foil/nylon) useful for various articles.

Advantageously, no ink smearing is exhibited by the solventless laminating adhesive of the present invention for a printed structure.

In addition, a fast PAA decay is exhibited by the solventless laminating adhesive of the present invention. For example, the PAA decay of the adhesive can be less than 2 ppb in one embodiment, less than 0.5 ppb in another embodiment, less than 0.2 ppb in still embodiment, after 2 days of curing. In some embodiments, the PAA decay of the adhesive, after 2 days of curing, can be from 0.0001 ppb to less than 2 ppb. In addition, the PAA decay of the adhesive can be from 0.0001 ppb to less than 2 ppb in less than or equal to (≤) 2 days in one embodiment, ≤1 day in another embodiment, and ≤half day in still another embodiment.

Another advantageous property exhibited by the solventless laminating adhesive is the increase or maintenance of bond strength of a digital ink printing structure adhesion which can be ≥300 g/25.4 mm in one embodiment, ≥400 g/25.4 mm in another embodiment, and ≥500 g/25.4 mm in still another embodiment. In some embodiments, the bond strength of a digital ink printing structure exhibited by the solventless laminating adhesive can be from 300 g/25.4 mm to 10,000 g/25.4 mm.

In another embodiment, the heat resistance property of the solventless laminating adhesive of the present invention can be increased or maintained and measured in terms of bond strength of an article or product after the article or product is subjected to a heat-sealing process at a predetermined temperature and for a predetermined amount of time. The heat resistance of the present invention adhesive can be generally ≥5,000 g/25.4 mm in one embodiment; ≥5,500 g/25.2 mm in another embodiment; and ≥6,000 g/25.4 mm in still another embodiment, for a non-printed structure. The heat seal test failure mode for a laminated structure is indicated as a whole film tear (WFT) of the laminated structure.

Viscosity is also another beneficial property of the adhesive of the present invention. For example, the mixing viscosity of the adhesive can be from 500 mPa·s to 10,000 mPa·s at 25° C. in one embodiment, from 600 mPa·s to 8,000 mPa·s at 25° C. in another embodiment, and from 800 mPa·s to 5,000 mPa·s at 25° C. in still another embodiment.

A method of forming a laminate using the solventless laminating adhesive of the present invention is also disclosed. In a preferred embodiment, the two-component solventless laminating adhesive composition comprising the mixed isocyanate component and polyol component discussed above, is in a liquid state at 25° C. Even if the adhesive composition is solid at 25° C., the adhesive composition can be heated above 25° C. as necessary to place the adhesive composition in a liquid state. In the liquid state, the adhesive composition can be more readily applied (surface coated) on a surface of a substrate layer. In some embodiments, a layer of the mixed adhesive composition is applied to a surface of a first substrate, such as a polymer film. A "film" is any structure that is 0.5 millimeter (mm) or less in one dimension and is 1 centimeter (cm) or more in both of the other two dimensions. A polymer film is a film that is made of a single polymer or mixture of two or more polymers.

Prior to applying the adhesive composition to a first film substrate, the isocyanate component and polyol component of the adhesive are mixed together to form a curable adhesive reaction mixture. In some embodiments, the weight ratio of the isocyanate component to the polyol component in the curable adhesive mixture is from 1:1.5 to 2:1, and the NCO index is from 1.6 to 1. In some embodiments, the coating weight of the adhesive applied to the film substrates is from 1.4 grams per square meter (g/m$^2$) to 3.5 g/m$^2$ in one embodiment, or from 1.6 g/m$^2$ to 3.0 g/m$^2$ in another embodiment. In some embodiments, the first substrate can be aluminum foil or metalized polymer films or a PET film or an OPP film or a nylon film. In some embodiments, the mixed adhesive composition is applied to the first substrate at any temperature and from room temperature (i.e., approximately 25° C.) up to 50° C. or higher, in one preferred embodiment.

In some embodiments, a surface of a second substrate or film is brought into contact with the layer of the curable adhesive mixture on the first substrate, prior to curing the adhesive, to form an uncured composite laminate. In some embodiments, the uncured laminate may be subjected to pressure, for example by passing through nip rollers, which may or may not be heated. In some embodiments, the uncured laminate may be heated to speed the cure reaction. However, the uncured laminate can reach full cure within 2 days at room temperature.

Suitable substrates (e.g., first and second substrates) for use according to this disclosure include, but are not limited to, films such as paper, woven and nonwoven fabric, metal foil, polymers, and metal-coated polymers. Films optionally have a surface on which an image is printed with ink; the ink may be in contact with the adhesive composition. The polymer films are corona treated before application of the adhesive composition and lamination of the films.

Generally, the bonding of two substrates using the solventless laminating adhesive composition of the present invention can be carried out in an industrial scale for production of large quantities of lamination products. Advantageously, the two components are filled and stored in separate containers, such as drums or hob bocks, until the components are ready to be used. As aforementioned, prior to the application of the adhesive composition, the two components are stored separately; and only during or immediately prior to the application of the adhesive are the two components mixed with one another. During application, the components are forced out of the storage containers by means of feed pumps, and metered into, via feed lines, a mixing apparatus, such as those commonly used for mixing two-component adhesives in industrial production. For example, the mixing of the two components can be done via static mixers or by means of dynamic mixers. When mixing the two components, care is taken to ensure that the two components are homogeneously mixed insofar as possible. If the two components are poorly mixed, there will be local deviations from the advantageous mixing ratio, which may have implications with respect to a deterioration of the mechanical properties of the resulting product made using the adhesive. In order to check the mixing quality visually it may be advantageous if the two components have two different colors. Good mixing is deemed to exist when the mixed adhesive has a homogeneous mixed color without visible streaks or smears. Controlling and maintaining the mixing ratio of the two components is preferable to achieve a desirable target performance of the adhesive.

The 2K polyurethane adhesive of the present invention can be used for all classes of laminates including, for example: laminated film-to-film or film-to-foil composites; and the adhesive can be used in packaging applications requiring three performance levels: "general-purpose", "medium-performance", and "high-performance" laminates. Typically, the final package product and its filling process determines the type of adhesive material used in the various applications. For instance, general-purpose laminates comprise film-to-film or film-to-paper composites and are typically used to pack dry foods stored at room temperature. Medium-performance laminates are typically used in fatty or acid food packaging, temperature treatments up to pasteurization temperatures, and foil laminates. And, high-performance laminates are typically used for boil-in bag applications, hot fillings, sterilization processes at elevated temperatures such as up to 140° C., pharmaceuticals, and the like.

In some embodiments, the 2K polyurethane adhesive of the present invention can be used, for example, in the following applications: high performance food packaging applications; and industrial packaging of non-food materials such as liquid or solid detergent, farmer chemicals, fertilizers, and the like.

EXAMPLES

The following Inventive Examples (Inv. Ex.) and Comparative Examples (Comp. Ex.) (collectively, "the Examples") are presented herein to further illustrate the present invention in detail but are not to be construed as limiting the scope of the claims. Unless otherwise stated all parts and percentages are by weight.

The various raw materials used in the Examples are identified in Table I.

TABLE I

Raw Materials

| Raw Material Name | Brief Description of Raw Material | OH Funct.[1] | OH#[2] or % NCO | Commercial Supplier |
|---|---|---|---|---|
| MOR-FREE ™ C-117 | Polyester polyol | 3 | 180 mgKOH/g | The Dow Chemical Company (Dow) |
| DEG adipate-isophthalate-based material | Aromatic polyester polyol | 2 | 136 mgKOH/g | Dow |
| Hexanediol adipate-based material | Hydrophobic polyester polyol | 2 | 112 mgKOH/g | Dow |
| STEPANOL ™ BC-180 | Hydrophobic polyester polyol from aromatic polyester transesterified with natural oil | 2 | 180 mgKOH/g | Stepan Company |
| MOR-FREE ™ C-156 | Hydrophobic polyester polyol from aromatic polyester transesterified with castor oil | 2 | 246 mgKOH/g | Dow |
| VORANOL ™232-034N | Polypropylene glycols | 3 | 34 mgKOH/g | Dow |
| Voranol CP-1055 | Polypropylene glycols |  | 156 mgKOH/g | Dow |
| Voranol 220-110 | Polypropylene glycols |  | 111 mgKOH/g | Dow |
| VORANOL ™ CP 450 | Polypropylene glycols | 3 | 383 mgKOH/g | Dow |
| Polyphosphoric Acid | 115% phosphoric acid | — | — | Aldrich |
| ISONATE ™ 125M | Diphenylmethane diisocyanate | — | 29% | Dow |

TABLE I-continued

Raw Materials

| Raw Material Name | Brief Description of Raw Material | OH Funct.[1] | OH#[2] or % NCO | Commercial Supplier |
|---|---|---|---|---|
| ISONATE™ 143L | Polycarbodiimide-modified diphenylmethane diisocyanate | — | 29% | Dow |
| MOR-FREE™ 980 | Polyurethane prepolymer, commercial solventless adhesive | — | 13.5% | Dow |
| MOR-FREE™ L75-191 | Polyurethane prepolymer, commercial solventless adhesive | — | 13.5% | Dow |
| MOR-FREE™ 403 | Polyurethane prepolymer, commercial solventless adhesive | — | 18% | Dow |
| MOR-FREE™ CR-85 | Commercial polyols coreactant | >3 | 174 mgKOH/g | Dow |
| MOR-FREE™ CR-83 | Commercial polyols coreactant | 3 | 181 mgKOH/g | Dow |
| MOR-FREE 698 | Polyurethane prepolymer, commercial solventless adhesive | — | 12.5% | Dow |
| MOR-FREE CR-60 | Commercial polyols coreactant | >3 | 233 mgKOH/g | Dow |
| Litoplas 5448 | Polyurethane prepolymer, commercial solventless adhesive | NT[3] | NT | COIM |
| Litoplas 5558 | Commercial polyols coreactant | NT | NT | COIM |

Notes for Table I:
[1]"Funct." = "Functionality"
[2]OH number ("OH#") represents the milligrams of potassium hydroxide equivalent to the hydroxyl content in one gram of polyol or other hydroxyl compound.
[3]"NT" = "Not tested".

Adhesive Components Preparation

Isocyanate Prepolymer 1 ("IP1") Synthesis

Table II describes the relevant raw materials for producing IP1. IP1 is synthesized as follows:

Add 1,061.9 grams (g) of ISONATE™ 125M into a 3,000 milliliters (mL) glass reactor under nitrogen purge. Then the reactor temperature is set to 45° C. Add 355.3 g of VORANOL™ 232-034N, 383.2 g of DEG adipate-based material, and 7.8 g of MOR-FREE™ 117 to the reactor. Next, add 191.8 g of hexanediol adipate-based material preheated to 60° C. to the reactor, thereby bringing the reactor temperature slowly to 78° C., with temperature stabilizing between 78° C. and 79° C. for 2 hours (hr). The resulting IP1 has a % NCO of 14.4 percent (%) as measured according to ASTM D2572-97 and a viscosity of 3,775 mPa·s at 25° C. as measured according to ASTM D2196.

Isocyanate Prepolymer 2 ("IP2") Synthesis

Table II also describes the relevant raw materials for producing IP2. IP2 is synthesized as follows:

Add 1,002 g of ISONATE™ 125M into a 3,000 mL glass reactor under nitrogen purge. Then, set the reactor temperature to 45° C. Add 562 g of VORANOL™ 232-034N and 240 g of DEG adipate-based material into the reactor. Next add 196 g of hexanediol adipate-based material preheated to 60° C. to the reactor, thereby bringing the reactor temperature slowly to 78° C., with temperature stabilizing between 78° C. and 79° C. for 2 hr. The resulting IP2 has a % NCO of 13.5% as measured according to ASTM D2572-97 and a viscosity of 2,885 mPa·s at 25° C. as measured according to ASTM D2196.

TABLE II

Compositions of IP1 and IP2

| Material | IP1 (g) | IP2 (g) |
|---|---|---|
| MOR-FREE™ C-117 | 7.8 | 0 |
| VORANOL™ 232-034N | 355.3 | 562 |
| DEG adipate-based material | 383.2 | 240 |
| Hexanediol adipate-based material | 191.8 | 196 |
| ISONATE™ 125M | 1,061.9 | 1,002 |
| TOTAL | 2,000.0 | 2,000 |

PU Prepolymer 1 ("IP3") Synthesis

Table III describes the relevant raw materials for producing IP3. IP3 is prepared by mixing the materials in the specified amounts described in Table III.

TABLE III

Composition of IP3

| Material | Amount (g) |
|---|---|
| IP1 | 99 |
| Isonate 143L | 1 |
| TOTAL | 100 |

Phosphate Ester Polyol 1 ("PEP1") Synthesis

Table IV describes the relevant raw materials for producing PEP1. PEP1 is synthesized as follows:

After purging nitrogen, add 110.2 g of VORANOL™ CP-450 and 3 g of polyphosphoric acid to a reactor under nitrogen purge at room temperature. Then set the reactor temperature to 100° C. and agitate the reactor contents for 1 hr. Bring the reactor temperature down to 50° C. and then introduce 36.8 g of ISONATE™ 125M into the reactor. The reactor temperature increases to approximately 94° C. due to the exothermic reaction. Control the reaction temperature at 76° C. to 79° C. for 30 minutes (min), then introduce 150 g of MOR-FREE™ C-156 to the reactor and maintain the reactor temperature at 78° C. for 90 min. The resulting PEP1 has an equivalent weight of 246 g/mole OH and a viscosity of 3,637 mPa·s at 50° C. as measured according to method of ASTM D2196.

Phosphate Ester Polyol 2 ("PE2") Synthesis

Table IV also describes the relevant raw materials for producing PEP2. PEP2 is synthesized as follows:

After purging nitrogen, add 55.1 g of VORANOL™ CP-450 and 1.5 g of polyphosphoric acid to a reactor under nitrogen purge at room temperature. Then set the reactor temperature to 100° C. and agitate the reactor contents for 1 hr. Bring the reactor temperature down to 50° C. and then introduce 18.4 g of ISONATE™ into the reactor. The reactor temperature increases to 80° C. due to the exothermic reaction. Control the reaction temperature at 78° C. for 2 hr. The resulting PEP2 has an equivalent weight of 186 g/mole OH according to ASTM D4274 and a viscosity of 25,300 mPa·s at 25° C. as measured according to ASTM D2196.

Phosphate Ester Polyol 3 ("PEP3") Synthesis

Table IV also describes the relevant raw materials for producing PEP3. PEP3 is synthesized as follows:

After purging nitrogen, charge the 856.9 g of Voranol CP-450 and 19.4 g of polyphosphoric acid into reactor under nitrogen at room temperature, then heat the reactor to 100° C. under agitation for 1 hr. After the reactor was cooling down to 50° C., charge the 123.7 g of Isonate 125M MDI into reactor under agitation the temperature increased to 80° C. due to exothermic reaction. Then, control the reaction temperature at 78° C. for 2 hr. The resultant product was dumped out of the reactor. The equivalent weight of the product was 270 mgKOH/g and the viscosity of the product was 18,580 mPa·s at room temperature. Brookfield viscosity of the product was measured at 25° C. according to ASTM D2196; and the OH# of the product was measured according to ASTM D4274.

TABLE IV

Compositions of PEP1, PEP2, and PEP3

| Material | PEP1 (g) | PEP2 (g) | PEP3 (g) |
|---|---|---|---|
| VORANOL ™ CP 450 | 110.2 | 55.1 | 856.9 |
| Polyphosphoric Acid | 3 | 1.5 | 19.4 |
| ISONATE ™ 125M | 36.8 | 18.4 | 123.7 |
| MOR-FREE ™ C-156 | 150 | — | — |
| TOTAL | 300 | 75 | 1,000.0 |

Preparation of Intermediate Component ("IC") Synthesis

An intermediate component used as an intermediate coreactant formulation is prepared as follows: charge castor oil 566 g and aromatic polyester polyol (e.g., a DEG adipate-isophthalate-based material) 434 g into a reactor, heat the reaction mixture to 220° C. for 2 hr until the materials are uniformly mixed at room temperature. Then cool the resultant reactor contents to 60° C. Remove the resultant intermediate coreactant formulation from the reactor and use the formulation. The resultant intermediate component used as an intermediate coreactant formulation (herein "IC") prepared as described above has a OH# of 150 mgKOH/g measured according to ASTM D4274 and a viscosity of 875 mPa·s measured at 25° C. according to ASTM D2196.

Coreactants 1 to 6 ("CR1 to CR6") Preparation

Table V describes the relevant materials blended together for producing each of CR1 through CR6. CR1 to CR6 are formulated by blending a particular polyol with a particular phosphate ester polyol in a high speed mixer, for example at 2,000 revolutions per minute (rpm) for 1 min.

TABLE V

Compositions of CR1 through CR6

| Material | CR1 | CR2 | CR3 | CR4 | CR5 | CR6 |
|---|---|---|---|---|---|---|
| PEP1 (g) | 10 | 5 | | | | |
| PEP2 (g) | | | 5 | 2.5 | 5 | 2.5 |
| MOR-FREE ™ C-156 (g) | 40 | 45 | | | 45 | 47.5 |
| STEPANOL ™ BC-180 (g) | | | 45 | 47.5 | | |
| Phosphate Content* (%) | 0.2 | 0.1 | 0.2 | 0.1 | 0.2 | 0.1 |
| Equivalent Weight (g/mole OH) | 246 | 246 | 292 | 302 | 238 | 242 |

*based on polyphosphate acid weight percent

Coreactant 7 ("CR7") Preparation

Table VI describes the relevant materials blended together for producing a coreactant component referred to herein as "CR7".

TABLE VI

Composition of CR7

| Material | Amount (g) |
|---|---|
| PEP3 | 8.0 |
| IC | 20.0 |
| Voranol CP-1055 | 60.0 |
| Voranol CP-450 | 9.0 |
| Voranol 220-110 | 3.0 |
| Total | 100.0 |

Adhesive Composition Preparation

Examples 1 to 7 ("Inv. Ex. to Inv. Ex. 7")

Table VII describes Inv. Ex. 1 to Inv. Ex. 7 which comprise the relevant components blended together for producing each of the two-component, solventless polyurethane-based laminating adhesive compositions of the present invention for use with laminate films. Each Inv. Ex. comprises a blend of an isocyanate prepolymer (e.g., IP1, IP2, IP3) and a coreactant (e.g., CR1 through CR6) blended together at a particular weight ratio in a high-speed mixer, for example at 2,000 rpm for 1 min. As noted above, the example coreactants comprise a blend of one or more polyols and phosphate esters.

Example 8 ("Inv. Ex. 8") which comprises the components of IP3 and CR7 blended together was conducted in a full-scale plant Schiavi laminator (manufactured by Schiavi) during the laminating processing for use with digital printed laminate films.

TABLE VII

Compositions of Inv. Ex. 1 to Inv. Ex. 8

| Example No. | Components (Prepolymer/Coreactant) | Prepolymer:Coreactant wt % ratio |
|---|---|---|
| Inv. Ex. 1 | IP1/CR1 | 100:60 |
| Inv. Ex. 2 | IP1/CR2 | 100:60 |
| Inv. Ex. 3 | IP1/CR3 | 100:71 |
| Inv. Ex. 4 | IP1/CR4 | 100:74 |
| Inv. Ex. 5 | IP1/CR5 | 100:58 |
| Inv. Ex. 6 | IP1/CR6 | 100:59 |
| Inv. Ex. 7 | IP2/CR5 | 100:57 |
| Inv. Ex. 8 | IP3/CR7 | 100:83 |

Comparative Examples a Through E ("Comp. Ex. A to Comp. Ex. E")

Table VIII describes Comp. Ex. A to Comp. Ex. E which comprise the relevant components blended together for producing each of the comparative two-component, solventless polyurethane-based laminating adhesive compositions for use with laminate films. Each of Comp. Ex. A to Comp. Ex. E comprises a blend of an isocyanate component, including an isocyanate prepolymer and a polyol component blended together at a particular weight ratio in a high-speed mixer, for example, at 2,000 rpm for 1 min. The mixing ratio for each example is also described in Table VIII. Each isocyanate component and each polyol component are commercially available from The Dow Chemical Company.

Comparative Examples F and G ("Comp. Ex. F" and "Comp. Ex. G") which comprise the components of MOR-FREE™ 698 and MOR-FREE™ CR60 blended together, and COIM 5448 and COIM 5558 blended together, respectively, were conducted in a full-scale plant Schiavi laminator during laminating processing for producing for use with digital printed laminate films.

and the samples are tested on a SENCORP™ 12ASL/1 heat sealer at 204° C. for 1 second (s). Then the bond strength test is performed on the heat-sealed samples on polyethylene side cut into 25.4 mm wide strips under the same conditions as described above in the bond strength test. The force at break value recorded is the average of testing performed on triplicate samples.

PAA Level Testing

The level of PAAs in a food-simulant is analyzed by diazotization of the PAAs, so that the concentration of PAAs can be determined colorimetrically. The aromatic amines existing in the test solution are diazotized in a chloride solution, and subsequently coupled with N-(1-naphthyl)-ethylene diamine dihydrochloride, giving a violet solution. An enrichment of the color is done with a fixed phase extraction column. The amount of the PAAs is determined photometrically at a wavelength of 550 nanometers (nm).

Article Preparation for PAA Test

Laminates prepared as described above are used to produce an article such as a pouch. Pouches are formed using the laminates described above by cutting a strip of about 30.5 cm×16.5 cm wide from the middle section of the

TABLE VIII

Compositions of Comp. Ex. A through Comp. Ex. G

| Example No. | Isocyanate Component | Coreactant | Mixing Ratio (Isocyanate Component/Coreactant) |
|---|---|---|---|
| Comp. Ex. A | MOR-FREE ™ 980 | MOR-FREE ™ CR-85 | 100/50 |
| Comp. Ex. B | MOR-FREE ™ L75-191 | MOR-FREE ™ CR-85 | 100/50 |
| Comp. Ex. C | MOR-FREE ™ 403 | MOR-FREE ™ CR-83 | 100/50 |
| Comp. Ex. D | IP1 | PEP2/MOR-FREE ™ CR-83 | 100/44 |
| Comp. Ex. E | MOR-FREE ™ L75-191 | CR1 | 100/57 |
| Comp. Ex. F | MOR-FREE ™ 698 | MOR-FREE ™ CR60 | 100/50 |
| Comp. Ex. G | COIM 5448 | COIM 5558 | 100/90 |

Laminate Preparation

The Inv. Ex. and Comp. Ex. are evaluated in a Prelam AL foil//GF-19 polyethylene sealant film laminate structure prepared by hand lamination. The Prelam AL foil film is a polyethylene terephthalate film having a thickness of 12 microns (μm) laminated to soft lamination grade AMCOR™ aluminum foil having a thickness of 9 μm. The GF-19 film is a linear low density polyethylene sealant film containing slip additives having a thickness of about 38 μm. All of the adhesive compositions of the Examples are applied on the surface of the laminate structures at a coating weight in the range of from 2.6 g/m² to 2.8 g/m².

Bond Strength Testing

A 90° T-peel test is performed on laminate samples cut into 25.4 millimeters (mm) wide strips and tested on a THWING ALBERT™ INSTRON peel tester equipped with a 50 N loading cell at a rate of 254 millimeters per minute (mm/min). When the two films forming the laminate separate, i.e., peel, the average of the force during the pull of the laminate is recorded. If one of the films stretches or breaks, the maximum force or force at break is recorded. The force at break value recorded is the average of testing performed on three separate laminate samples. T-peel tests are conducted at time intervals, for example, as follows: after six hours, after one day, after seven days, and after fourteen days after the laminate is made.

Heat Resistance Testing

Heat resistance testing is performed on heat sealed samples on polyethylene side cut into 25.4 mm wide strips laminate. Each strip is folded to form a 14 cm×16.3 cm surface area, and heat sealing an edge of about 1 cm along each open longitudinal edge of the folded strip to form a pouch with an inner surface area of 14 cm×14.3 cm. The equipment used for heat sealing the edges is a Brugger HSG-C heat sealer. Sealing conditions for the strips of laminates are: pressures of from $1.3 \times 10^5$ Pa to $1.5 \times 10^5$ Pa and temperatures of from 130° C. to 160° C.

Four pouches (two blanks and two test pouches), each with an inner surface area of about 14.0 cm×14.3 cm, are used for each film of the Examples. Each pouch is formed after two days from the time of formation of the respective laminate. Prior to forming a pouch, the laminate is stored at room temperature under ambient atmosphere.

For testing, each pouch is filled with 100 mL of 3% aqueous acetic acid, which is used as the food simulant. The pouches are stored at 70° C. in an air circulation oven for 2 hr. After cooling the pouches to room temperature, 100 mL of test solution is mixed with 12.5 mL of hydrochloric acid solution (1 N) and 2.5 mL of sodium nitrite solution (0.5 g per 100 mL of solution) are added to the pouches. Then, the contents of the pouch are allowed to react for 10 min. Ammonium sulfamate (5 mL; 2.5 g per 100 mL of aqueous [aq.] solution) is added to the pouches and allowed to react for 10 min. A coupling reagent (5 mL; 1 g of N-(1-naphthyl)-ethylenediamine dihydrochloride per 100 g of aq. solution) is added to the pouches, and allowed to react for 2 hr. After each addition, the resulting mixture is stirred with a glass rod. For the "blank pouches," 100 mL of the test solution is mixed with the derivation reagents as discussed above, except for the sodium nitrite.

The test solutions are concentrated by elution through an ODS solid phase extraction column (ODS reverse phase, C18 end capped), and the extinction coefficient is measured at 550 nm using a spectrophotometer (a Spectrophotometer Lambda available from Perkin Elmer).

The column of the spectrophotometer is conditioned using, first, 10 mL of methanol, followed by 10 mL of elution solvent, and then 10 mL of aqueous hydrochloric acid solution (0.1 N). Each derivatized sample is added to the column using a glass beaker previously rinsed twice with 3 mL of aqueous hydrochloric acid solution (0.1 N). The column is subject to a vacuum (about 2.5 mm Hg) pull, to remove all rinse, for 1 min. Then, 5 mL of elution solvent is added to the column, and this step is repeated until 10 mL of eluent is collected.

To determine the concentration of PAA, the extinction coefficient of the reaction product is measured at 550 nm, in a 5 cm cell, against the reagent blank solution and a series of standards with known concentrations of aniline hydrochloride, which are processed in parallel.

Performance Results

Table IX describes various performance results of each of the Examples obtained by testing each of the laminates prepared as described in the Examples.

The performance of the test sample laminates for digital printing structure application was evaluated in a full scale plant Schiavi laminator with the metering roll of the laminator being at a temperature of 40° C., the nip roll of the laminator being at a temperature of 40° C., and running the laminator at a running speed of 250 meters per minute (m/min) in printed 12 μm PET//LEPE 25 μm, printed 12 μm PET//PET and 15 μm BOPP//25 μm PE structures. The sample laminates of the Inv. Ex. were compared to Comp. Ex. F: MOR-FREE 698/MOR-FREE™ CR60 (mix ratio: 100/50) and Comp. Ex. G: COIM 5448/5558 (mix ratio: 100/90).

TABLE X

Laminate Performance of Digital Printed Structures After 7 days Curing

| Laminate Structure | Inv. Ex. 8 (g/25.4 mm) | | Comp. Ex. F (g/25.4 mm) | |
|---|---|---|---|---|
| | with INK | without INK | with INK | without INK |
| PET//PE | 485 | 540 | 185 | 220 |
| BOPP//PE | 340 | 520 | 170 | 205 |

TABLE IX

Laminate Performance Results

| Example No. | PAA[1] (ppb) | Bond strength (g/25.4 mm) | | | | Morton Aging[2] | Ink Smearing[3] | Heat Resistance[4] (bond test g/25.4 mm); Failure/Immediate Hand Peel Failure |
|---|---|---|---|---|---|---|---|---|
| | | 6 hr | 1 day | 7 day | 14 day | | | |
| Inv. Ex. 1 | 0.19 | 459 | 1,097 | 1,028 | 1,214 | 401 | 0 | 6,318; WFT/no DL |
| Inv. Ex. 2 | 0.12 | 457 | 1,442 | 1,230 | 1,273 | 164 | 0-1 | 5,876; WFT/no DL |
| Inv. Ex. 3 | 0.12 | 366 | 1,346 | 1,467 | 1,309 | 325 | 0 | 6,513; WFT/no DL |
| Inv. Ex. 4 | 0.16 | 296 | 1,396 | 1,237 | 1,233 | 444 | 0 | 5,952; WFT/no DL |
| Inv. Ex. 5 | 0.18 | — | 1,097 | 1,208 | 1,269 | 147 | 0 | 6,553; WFT/no DL |
| Inv. Ex. 6 | 0.13 | — | 1,314 | 1,362 | 1,271 | 163 | 0-1 | 6,171; WFT/no DL |
| Inv. Ex. 7 | 0.1 | 413 | 1,290 | 1,386 | 1,288 | 164 | 0-1 | 7,151; WFT/no DL |
| Comp. Ex. A | >5 | 589 | 1,131 | 636 | — | 26 | >3 | 5,892; DL/60% DL |
| Comp. Ex. B | >0.5 | 575 | 837 | 830 | 729 | 21 | >3 | 6,123; DL/60% DL |
| Comp. Ex. C | 7.4 | 483 | 1,194 | 681 | 788 | 14 | >3 | 6,277; DL/50% DL |
| Comp. Ex. D | — | 839 | 1,243 | 1,184 | — | 40 | 0-1 | — |
| Comp. Ex. E | — | — | 1,283 | 1,043 | — | 34 | 3 | — |

Notes for Table IX:
[1]Primary Aromatic Amine (PAA) measured after 2 days curing at 25° C. and 50% humidity environment.
[2]Morton sauce aging: a 15.2 cm × 10.2 cm pouch is filled with 100 mL 1/1/1 Morton Sauce (1 part corn oil, 1 part ketchup, 1 part vinegar by weight); heated in an oven at 60° C. for 100 hours; and then tested for bond strength.
[3]Ink smearing resistance test is carried out with a 50 g standard weight on a 15.2 cm cotton tipped applicator at 45° - 60° angle on 0.75 cm² -1 cm² area samples as follows: initial 5 cycle rubs after 1 min contamination, then 5 cycle rubs after 20 min contamination at room temperature with the following rating: 0, no orange ink; 1. slightly remove ink; 2, significantly remove ink, 3, totally remove the ink. The Ink coated substrate used is available from Flexa which is a polyurethane solvent-based ink printed by a Flexographic machine.
[4]204° C. for 1 s at 0.276 mPa with 25.4 mm width strips after 7 days curing, PE seal to PE of Foil//PE structure and peel immediately by hand to read delamination % area or no delamination. Bond test was conducted after heat seal to read bond strength and failure mode. "WFT" indicates the whole film structure tears; "DL" indicates delamination.

As indicated in Table IX, the Inv. Ex. exhibit superior primary aromatic amine decay compared with the Comp. Ex. In particular, each Inv. Ex. exhibits less than 0.2 parts per billion (ppb) primary aromatic amine two days after curing. In addition, the Inv. Ex. exhibit good bond strength at each interval, and particularly outperform the Comp. Ex. at the 1 day, 7-day and 14-day tests. For the Morton Aging tests, the Inv. Ex. exhibit bonds an order of magnitude greater than those exhibited by the Comp. Ex. Still more, the Inv. Ex. exhibit either no ink damage or slight ink removal, whereas the ink is completely removed from the Comp. Ex. after testing. Also, the Inv. Ex. did not experience delamination after testing while each of the Comp. Ex. exhibited delamination.

TABLE X-continued

Laminate Performance of Digital Printed Structures After 7 days Curing

| Laminate Structure | Inv. Ex. 8 (g/25.4 mm) | | Comp. Ex. F (g/25.4 mm) | |
|---|---|---|---|---|
| | with INK | without INK | with INK | without INK |
| PET[1]//metPET | 475 | 490 | 200 | 235 |
| PET[2]//metPET | 397 | 350 | 195 | 250 |

[1]digital printed - almost completely printed in white;
[2]digital printed - predominant colors are red and black

TABLE XI

Thermal Seal Resistance of Digital Printed
Structures After 7 Days Curing

| Laminate Structure | Inv. Ex. 8 (g/25.4 mm) | | Comp. Ex. F (g/25.4 mm) | |
| --- | --- | --- | --- | --- |
| | with INK | without INK | with INK | without INK |
| PET//PE | 485 | 660 | 140 | 175 |
| BOPP//PE | 550 | 545 | 125 | 160 |
| PET[1]//metPET | 700 | 505 | 145 | 180 |
| PET[2]//metPET | 550 | 450 | 150 | 185 |

[1]digital printed - almost completely printed in white;
[2]digital printed - predominant colors are red and black

TABLE XII

Laminate Performance of Digital Printed Structures After 7 Days Curing

| Laminate Structure | Product Packaged | Inv. Ex. 9 (g/25.4 mm) | Comp. Ex. G (g/25.4 mm) |
| --- | --- | --- | --- |
| BOPP (15 μm)/metBOPP (15 μm) | snack/dry food | 230 | 188 |
| BOPP (15 μm)/metBOPP (15 μm) | snack/dry food | 390 | 289 |
| PET Dig.ink[1]/metBOPP/PE (25 μm) | snack/dry food | 410 | 352 |
| PET Dig.ink/metBOPP/PE (25 μm) | snack/dry food | 492 | 384 |

[1]"Dig.ink" stands for "digital ink".

TABLE XIII

Thermal Seal Resistance of Digital Printed Structures After 7 Days Curing

| Laminate Structure | Product Packaged | Inv. Ex. 9 (g/25.4 mm) | Comp. Ex. G (g/25.4 mm) |
| --- | --- | --- | --- |
| BOPP (15 μm/metBOPP (15 pm) | snack/dry food | 590 | 550 |
| BOPP (15 μm)/metBOPP (15 pm) | snack/dry food | 573 | 485 |
| PET Dig.ink[1]/metBOPP/PE (25 pm) | snack/dry food | 5006 | 4841 |
| PET Dig.ink/metBOPP/PE (25 pm) | snack/dry food | 5467 | 5494 |

[1]"Dig.ink" stands for "digital ink".

What is claimed is:

1. A two-component solventless adhesive composition, comprising:
   (A) at least one isocyanate component comprising an isocyanate prepolymer that is the reaction product of:
      (Ai) at least one polyisocyanate; and
      (Aii) at least one isocyanate-reactive component comprising:
         (Aiia) at least one polyol having a functionality greater than two;
         (Aiib) at least one aromatic polyester polyol having a functionality of greater than two different than the polyol in Aiia; and
         (Aiic) at least one hydrophobic polyol different than the polyol in Aiia, and Aiib;
   (B) at least one polyol component comprising:
      (Bi) at least one polyether polyol having a functionality greater than two;
      (Bii) at least one aromatic polyester polyol transesterified with a natural oil; and
      (Biii) at least one phosphate ester polyol.

2. The two-component solventless adhesive composition of claim 1, wherein the polyisocyanate, component (Ai) in the isocyanate prepolymer is 4,4'-methylene diphenyl diisocyanate or modified 4,4'-methylene diphenyl diisocyanate.

3. The two-component solventless adhesive composition of claim 1, wherein the hydrophobic polyol in the isocyanate-reactive component is a polyester polyol.

4. The two-component solventless adhesive composition of claim 1, wherein the natural oil is castor oil.

5. The two-component solventless adhesive composition of claim 1, wherein the aromatic polyester polyol transesterified with a natural oil is hydrophobic.

6. The two-component solventless adhesive composition of claim 1, wherein the phosphate ester polyol is made from a tri-functional propylene glycol, a polyphosphoric acid, and a polyisocyanate, the phosphate ester polyol having a phosphoric acid content of less than 3 weight percent based on the weight of the phosphate ester polyol, and a viscosity less than 40,000 milliPascals-seconds at 25° C.

7. The two-component solventless adhesive composition of claim 1, wherein the weight ratio of the isocyanate component (A) to the polyol component (B) [A:B] is from 1:1.5 to 2:1 and wherein the isocyanate (NCO) index is from 1.6 to 1.

8. A method for forming a laminate structure, comprising the steps of:
   (I) mixing reactants to form a solventless adhesive composition, the reactants comprising:
      (A) at least one isocyanate component comprising an isocyanate prepolymer that is the reaction product of:
         (Ai) at least one polyisocyanate; and
         (Aii) at least one isocyanate-reactive component comprising:
            (Aiia) at least one polyol having a functionality greater than two;
            (Aiib) at least one aromatic polyester polyol having a functionality of greater than two different than the polyol in Alia; and
            (Aiic) at least one hydrophobic polyester polyol different than the polyol in Aiia and Aiib;
      (B) at least one polyol component comprising:
         (Bi) at least one polyether polyol having a functionality greater than two;
         (Bii) at least one aromatic polyester polyol transesterified with a natural oil; and (Biii) at least one phosphate ester polyol (II) applying a layer of the solventless adhesive composition to a surface of a first substrate;

(III) bringing the layer of the solventless adhesive composition on the surface of the first substrate into contact with a surface of a second substrate to form a laminate; and (IV) curing the adhesive composition.

9. The method for forming a laminate structure of claim 8, wherein mixing the reactants further comprises mixing the isocyanate component and the polyol component at a weight ratio of from 1:1.5 to 2:1 and wherein the isocyanate (NCO) index is from 1.6 to 1.

10. The method for forming a laminate structure of claim 8, wherein the polyether polyol with a functionality of greater than two is a glycerin initiated polypropylene oxide, polyethylene oxide, polybutylene oxide or mixtures thereof.

11. The method for forming a laminate structure of claim 8, wherein the natural oil is castor oil.

12. The method for forming a laminate structure of claim 8, wherein the phosphate ester polyol is made from a tri-functional propylene glycol, a polyphosphoric acid, and a polyisocyanate, the phosphate ester polyol having a phosphoric acid content of less than 3 weight percent based on the weight of the phosphate ester polyol, and a viscosity of less than 40,000 milliPascals-seconds at 25° C.

13. A laminate structure formed by the method according to claim 8.

14. A method for forming a laminate structure, comprising the steps of:

(I) mixing reactants to form a solventless adhesive composition, the reactants comprising:
(A) at least one isocyanate component comprising an isocyanate prepolymer that is the reaction product of:
(Ai) at least one polyisocyanate; and
(Aii) at least one isocyanate-reactive component comprising:
(Aiia) at least one polyol having a functionality greater than two;
(Aiib) at least one aromatic polyester polyol having a functionality of greater than two different than the polyol in Aiia; and
(Aiic) at least one hydrophobic polyester polyol different than the polyol in Aiia and Aiib;
(B) at least one polyol component comprising:
(Bi) at least one polyether polyol having a functionality greater than two;
(Bii) at least one hydrophobic aromatic polyester polyol transesterified with a natural oil; and
(Biii) at least one phosphate ester polyol (II) applying a layer of the solventless adhesive composition to a surface of a first substrate;

(II) bringing the layer of the solventless adhesive composition on the surface of the first substrate into contact with a surface of a second substrate to form a laminate; and (IV) curing the adhesive composition.

* * * * *

UNITED STATES PATENT AND TRADEMARK OFFICE
CERTIFICATE OF CORRECTION

PATENT NO. : 11,746,266 B2
APPLICATION NO. : 17/068348
DATED : September 5, 2023
INVENTOR(S) : Guo et al.

It is certified that error appears in the above-identified patent and that said Letters Patent is hereby corrected as shown below:

In the Claims

Claim 14 – Column 24, Line 24, Replace "(II)" with --(III)--

Signed and Sealed this
Twenty-sixth Day of December, 2023

Katherine Kelly Vidal
*Director of the United States Patent and Trademark Office*